Sept. 19, 1933.    M. BIRKIGT    1,927,769
VALVE CONTROL SYSTEM
Filed Dec. 3, 1930
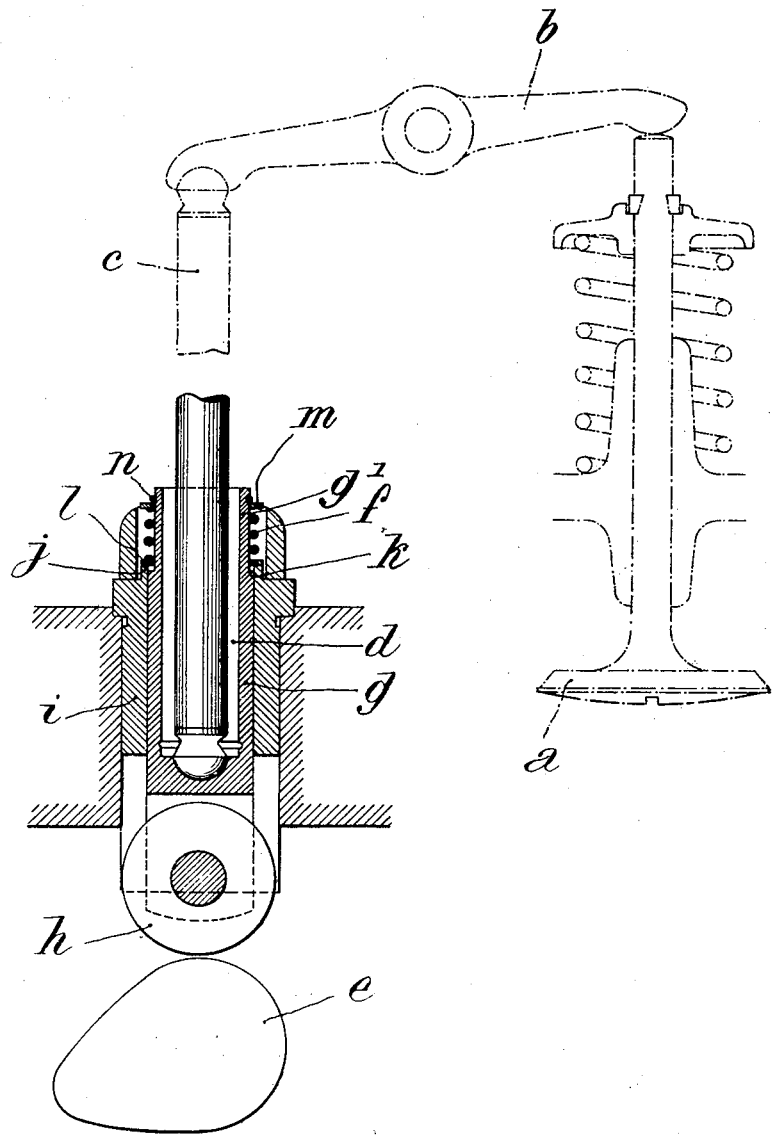
Inventor:
Marc Birkigt.
Attorney:

Patented Sept. 19, 1933

1,927,769

UNITED STATES PATENT OFFICE 1,927,769

VALVE CONTROL SYSTEM

Marc Birkigt, Bois-Colombes, France

Application December 3, 1930, Serial No. 499,779, and in Belgium September 25, 1930

1 Claim. (Cl. 123—90)

The present invention relates to valve control systems and, more particularly to those designed for use in internal combustion motors for automobiles and like vehicles.

One of the objects of the invention is to provide means for diminishing the noise and wear in the assemblies now interposed between the cam-shaft and valve for effecting the opening and closing movements of the latter.

Other objects will appear in the course of the detailed description now to be given with reference to the accompanying drawing, in which the single figure represents one illustrative embodiment of the invention.

Supposing an internal combustion motor to be provided with valves driven by a cam shaft, there being interposed, between the cam and the valve stem, at least one intermediate element, for instance, a motor in which the valves $a$ are driven by the rockers $b$, which are themselves driven by swivel rods $c$, pushed by push rods $d$ directly by the cam $e$, and supposing the said motor has to be assembled so that the driving gear of its valves functions according to the invention, the following structures may be used:

A spring $f$ acts, with a pressure inferior to that of the valve spring gear, in a direction corresponding to the opening of the said valve, upon at least one of the elements disposed between the cam and the considered valve stem.

The spring $f$ is, preferably, made to act on the push rod $d$ and is, also preferably, given a strength to counterbalance the weight of the block constituted by the push and swivel rods.

If the push rod be constituted, as illustrated on the drawing, by a tubular element $g$ carrying a roller $h$ positioned to be pushed up by a cam $e$, the said tubular element sliding inside an appropriate guide $i$, the spring $f$ may be advantageously disposed as follows:—

The guide $i$ is provided with an upper plane edge $j$.

The upper portion $g^1$ of the tubular element $g$ is given a diameter smaller than that of the sliding part in the guide $i$, the lower and upper portions being connected by a radial edge $k$; the latter positioned so that, when the push rod reaches its theoretical low point, the radial edge $k$ is slightly in recess (for instance, 1 mm.) with respect to the upper edge $j$ of the guide $i$.

The upper portion $g^1$ of the element $g$ is first provided with a washer $l$ which rests on the above mentioned edge $j$.

The spring $f$ is then mounted on $l$, its upper part being fixed to the upper portion of element $g$; in doing this, the tension of the spring should be adjusted to exert at rest the required pressure on the push rod.

After the spring has been placed in position, it is connected to the push rod, for instance, by providing the cylindrical part $g$ with a washer $m$. Washer $m$ may then be fixed in position by means of a split ring $n$ fitting elastically into a groove on the above mentioned cylindrical part.

It is evident that, since the radial edge $k$ is, at rest, slightly in recess with respect to the upper edge $j$ of guide $i$, the spring exerts its pressure in the direction corresponding to the opening of the valve, this contributing to suppress any rattling in the gear.

On the other hand, as soon as the push rod has been pushed up a certain amount, the radial edge $k$ strikes washer $l$, which comes off the upper edge $j$ of guide $i$, the spring being then lifted up with the push rod.

Spring $f$, it will be seen, functions to hold back the push rod at the end of its down-stroke.

Since the cam is designed, generally, so that there is a clearance between the push rod and the inactive part of the cam for securing a good shutting of the valve, the braking action exerted on the push rod by spring $f$ contributes to prevent said push rod coming in contact with the cam on its inactive part. A further function of the spring consists in holding the push rod in a correct position ready for the next stroke.

The noise due to the push rod striking on the inactive part of the cam—as was usually the case heretofore, may thus be avoided.

In addition to this, spring $f$ contributes in keeping the push rod in contact with the swivel rod, the latter with the rocker and the rocker with the valve.

It should be borne in mind that the arrangement described above is quite different from certain former devices, whose driving gears are fitted with a spring for keeping the push rod against the cam. On account of the masses in motion, this spring (which acted in a direction opposite to that of the applicant) had to be made relatively strong, which resulted in rapid wear of the parts in functional contact.

It has been found that spring $f$ appreciably reduces the noise of the driving gear, mainly at high motor speeds.

Its presence being not an additional source of wear, the noise of the valve gear does not increase with time, and, the various elements being kept in contact, there is no danger of breakdown or running out of order.

The invention is, of course, by no means confined to the example described above. On the contrary, it may be applied so that the elastic system (spring $f$), instead of acting on the push rod, exerts its pressure on any other part of the gear, for instance on the swivel rod, on the rocker, or on several parts simultaneously.

What I claim is:—

In an internal combustion engine, a valve provided with a valve stem, a cam, and means operated by said cam for controlling said valve stem, said means including an intermediate element, and means operative on said intermediate element as it approaches the end of its movement nearest the low point of the cam to urge said element away from the cam, said last means including spaced shoulders on said intermediate element, a fixed abutment, said fixed abutment lying between said shoulders when the intermediate element is at the said end of its movement, a spring between said shoulders, and a collar between one of said shoulders and said spring engageable with said fixed abutment to maintain the spring compressed when the abutment is in a position between the two said shoulders, whereby the load is transferred to said fixed abutment when the element is at the end of its movement nearest the low point of the cam.

MARC BIRKIGT.